(12) United States Patent
Xiao

(10) Patent No.: US 6,412,941 B1
(45) Date of Patent: Jul. 2, 2002

(54) FULLY-COVER SHELTER FRAME

(76) Inventor: Tony Xin Xiao, 1235 Lindengrove AVe., Rowland Heights, CA (US) 91748

( * ) Notice: Subject to any disclaimer, the term of this patent is extended or adjusted under 35 U.S.C. 154(b) by 0 days.

(21) Appl. No.: 09/658,230

(22) Filed: Sep. 8, 2000

(51) Int. Cl.[7] .................................................. G02C 9/00
(52) U.S. Cl. ........................................ 351/47; 351/57
(58) Field of Search ............................. 351/51, 52, 47, 351/57, 83, 48, 58

(56) References Cited

U.S. PATENT DOCUMENTS

| | | | | |
|---|---|---|---|---|
| 5,080,475 A | * | 1/1992 | Ferron .......................... | 351/57 |
| 5,980,036 A | * | 11/1999 | Solomon ...................... | 351/47 |

FOREIGN PATENT DOCUMENTS

| | | | | |
|---|---|---|---|---|
| EP | 0 357 523 | * | 3/1990 | ................... 351/47 |

* cited by examiner

Primary Examiner—Huy Mai

(74) Attorney, Agent, or Firm—Raymond Y. Chan; David and David Patent Group

(57) ABSTRACT

A fully-cover shelter frame is adapted for detachably mounting on a primary spectacle frame which includes a frame body for mounting a pair of lenses in position. The frame body includes a primary bridge connected between the two lenses, two side extensions provided at two outer sides of the lenses respectively, and two hinge members extended rearwardly from said side extensions for pivotally coupling a pair of temples respectively. Each of the side extensions has an engaging surface provided thereon. The shelter frame, which supports two auxiliary lenses thereon. includes a bridge extended between the two auxiliary lenses, a pair of cover rims rearwardly extended from the two auxiliary lenses respectively for encircling the two lenses of the primary spectacle frame respectively wherein each of the cover rims has a width at least wider than a gap between the auxiliary lens and the lens such that the lens is adapted for concealing from the respective cover rim, and two magnetic engaging means which are provided at two outer sides of the two auxiliary lenses respectively for magnetically attracting with the engaging surfaces of the two side extensions of the primary spectacle frame so as to securely mount the shelter frame on the shelter frame on the primary spectacle frame.

6 Claims, 14 Drawing Sheets

FULLY-COVER SHELTER FRAME

BACKGROUND OF THE PRESENT INVENTION

1. Field of Invention

The present invention relates to a spectacle frame, and more particularly to a fully-cover shelter frame for supporting auxiliary lenses, such as sunglasses, wherein the fully-cover shelter frame is adapted for detachably mounting on a primary spectacle frame, so as to provide a unique appearance with the primary spectacle frame.

2. Description of Related Arts

An auxiliary shelter frame is widely used today. A conventional shelter frame such as clip-on sunglasses is adapted to detachably mount on a shortsighted or farsighted eyeglasses so that the wearer does not need to pay for and carry another shortsighted or farsighted sunglasses. The conventional shelter frame usually has a similar shape and size of the primary spectacle frame in order to provide a better appearance of the primary eyeglasses. However, when the shelter frame is mounted on the primary spectacle frame, as shown in FIG. 1, there is a gap between the two frames, which may destroy the appearance of the eyeglasses. Moreover, if the size or shape of the shelter frame is slightly different from the primary spectacle frame, the shelter frame may not fittingly mount on the primary spectacle frame with a correct alignment, such that the shelter frame may easily drop off from the primary spectacle frame. Thus, lights from surrounding may enter from the gap between the shelter frame and the primary spectacle frame, which may be deflected between the lenses of the primary spectacle frame and the auxiliary lenses of the shelter frame. So, the object that the wearer to see will become ambiguous, which is dangerous especially when the wearer is driving. The wearer's eyes may get hurt by the deflected light since the focus of the object may change by the inconsistent deflected light.

SUMMARY OF THE PRESENT INVENTION

A main object of the present invention is to provide a fully-cover shelter frame, which is adapted for detachably mounting on a primary spectacle frame in order to provide a unique appearance of the primary spectacle frame.

Another object of the present invention is to provide a fully-cover shelter frame, which is adapted for mounting on any kinds of primary spectacle frame has a smaller size and shape. In other words, the fully-cover shelter frame does not need to be exact the same size and shape of the primary spectacle frame for securely mounting thereon.

Another object of the present invention is to provide a fully-cover shelter frame for spectacle frame, wherein the fully-cover shelter frame comprises a cover rim for encircling the frame rims of the primary spectacle frame, so as to block the light from surrounding to enter a gap between the shelter frame and the primary spectacle frame for protecting the user's eyes.

Another object of the present invention is to provide a fully-cover shelter frame for spectacle frame, wherein the wearer may merely use one hand to attach or detach the shelter frame during exercising or driving.

Accordingly, in order to accomplish the above objects, the present invention provides a fully-cover shelter frame adapted for mounting in front of a primary spectacle frame which comprises a frame body for mounting a pair of lenses in position. The frame body comprises a primary bridge connected between the two lenses, two side extensions provided at two outer sides of the lenses respectively, and two hinge members extended rearwardly from the two side extensions for pivotally coupling a pair of temples respectively.

The shelter frame which supports two auxiliary lenses comprises a bridge extended between the two auxiliary lenses, a pair of cover rims rearwardly extended from the two auxiliary lenses respectively, which are adapted for entirely encircling the two lenses of the primary spectacle frame, and a magnetic engaging means for securely mounting the shelter frame on the frame body of the primary spectacle frame.

In order to mount the shelter frame in front of the frame body of the primary spectacle frame, simply put the shelter frame in front of the primary spectacle frame wherein the two cover rims of the shelter frame are aligned with the two lenses of the primary spectacle frame respectively. Due to the magnetic attraction, the shelter frame is magnetically attached to the frame body of the primary spectacle frame.

DETAILED DESCRIPTION OF THE PREFERRED EMBODIMENT

Figure 1:
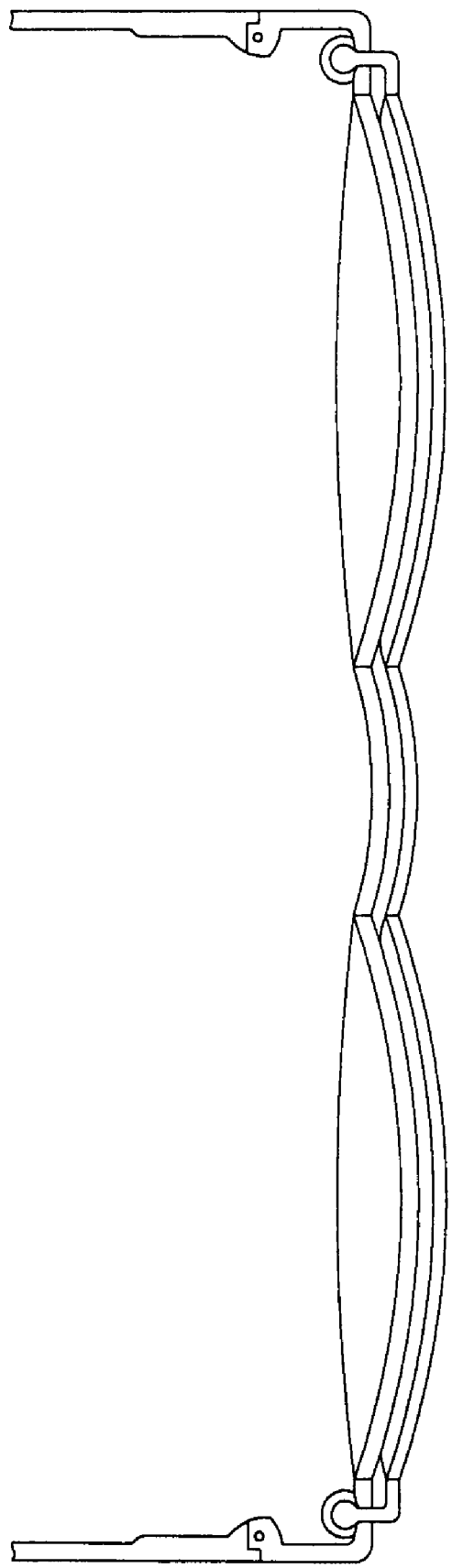
FIG. 1 is a top view of a conventional shelter frame mounted on a primary spectacle frame.

Referring to FIGS. 2 to 5 of the drawings, a fully-cover shelter frame 20 adapted for detachably mounting on a primary spectacle frame 10 according to a first preferred embodiment of the present invention is illustrated. The primary spectacle frame 10 comprises a frame body 11 for mounting a pair of lenses 121, 122 in position. The frame body 11 comprises a primary bridge 111 connected between the two lenses 121, 22, two side extensions 13, 14 provided at two outer sides of the lenses 121, 122 respectively, two hinge members 130, 140 extended rearwardly from said side extensions for pivotally coupling a pair of temples 112, 113 respectively.

Figure 2:
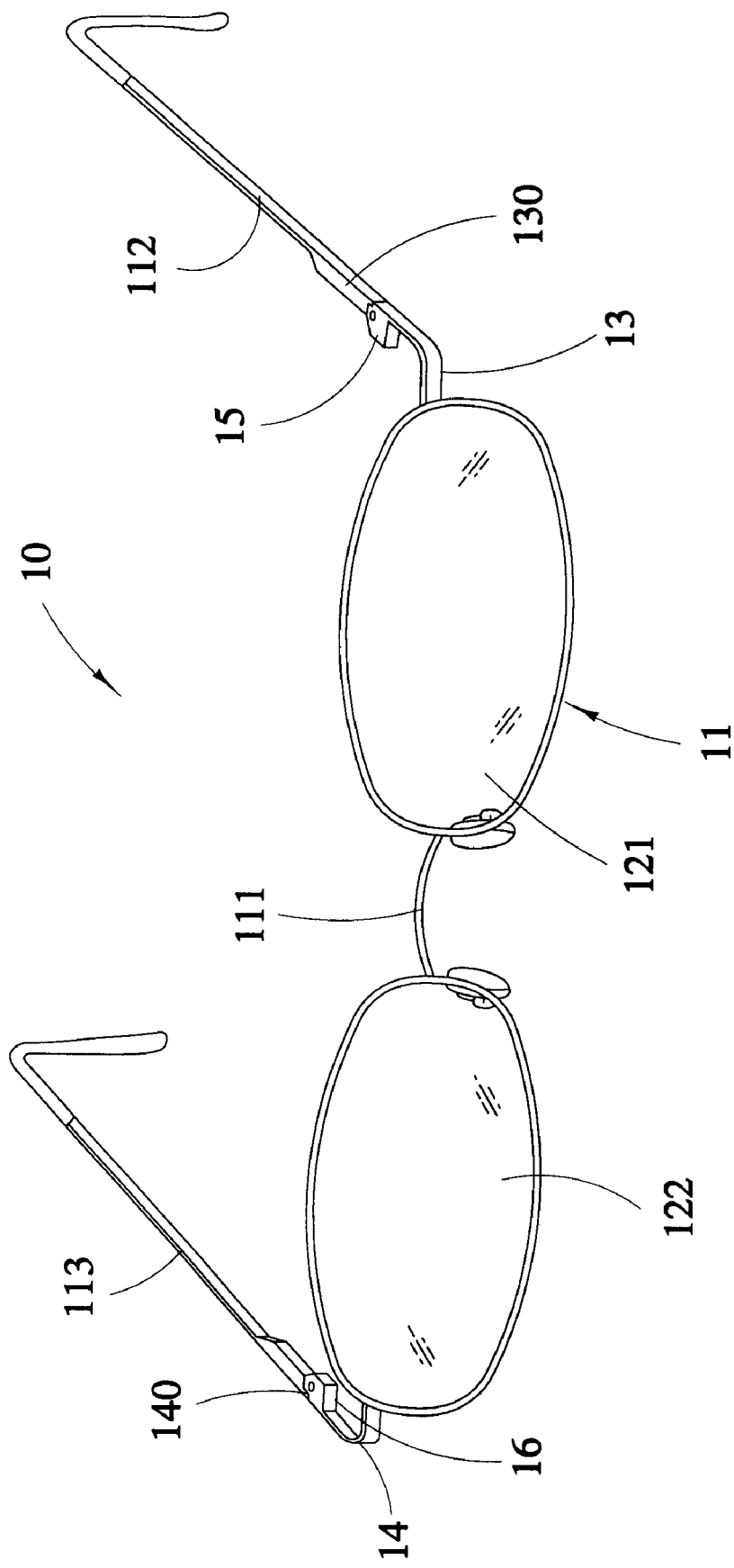
FIG. 2 is a perspective view of the primary spectacle frame.

Practically, the frame body 11 can be constructed as a conventional spectacle frame to have a pair of rims, as shown in FIG. 2, or a rimless frame that the primary bridge 111 and the two side extensions 13, 14 are directly fastened to the edges of the two lenses 121, 122. The major different between the primary spectacle frame 10 of the present invention and the conventional spectacle frame is the two side extensions 13, 14, each of which has an engaging surface 15, 16, facing frontwardly, provided thereon.

According to the first preferred embodiment of the present invention, the two side extensions 13, 14 are preferred be made of soft-magnetic metal having magnetic attraction ability such as mild steel, low carbon steel and high grade steel. The two side extensions 13, 14 comprise the engaging surface 15, 16 provided on a front end 131, 141 of the hinge member 130, 140 wherein each engaging surface is an enlarged surface area provided on the respective hinge member 130. 140. which is adapted to be magnetically attracted by a magnetic material such as permanent magnet.

Figure 3:
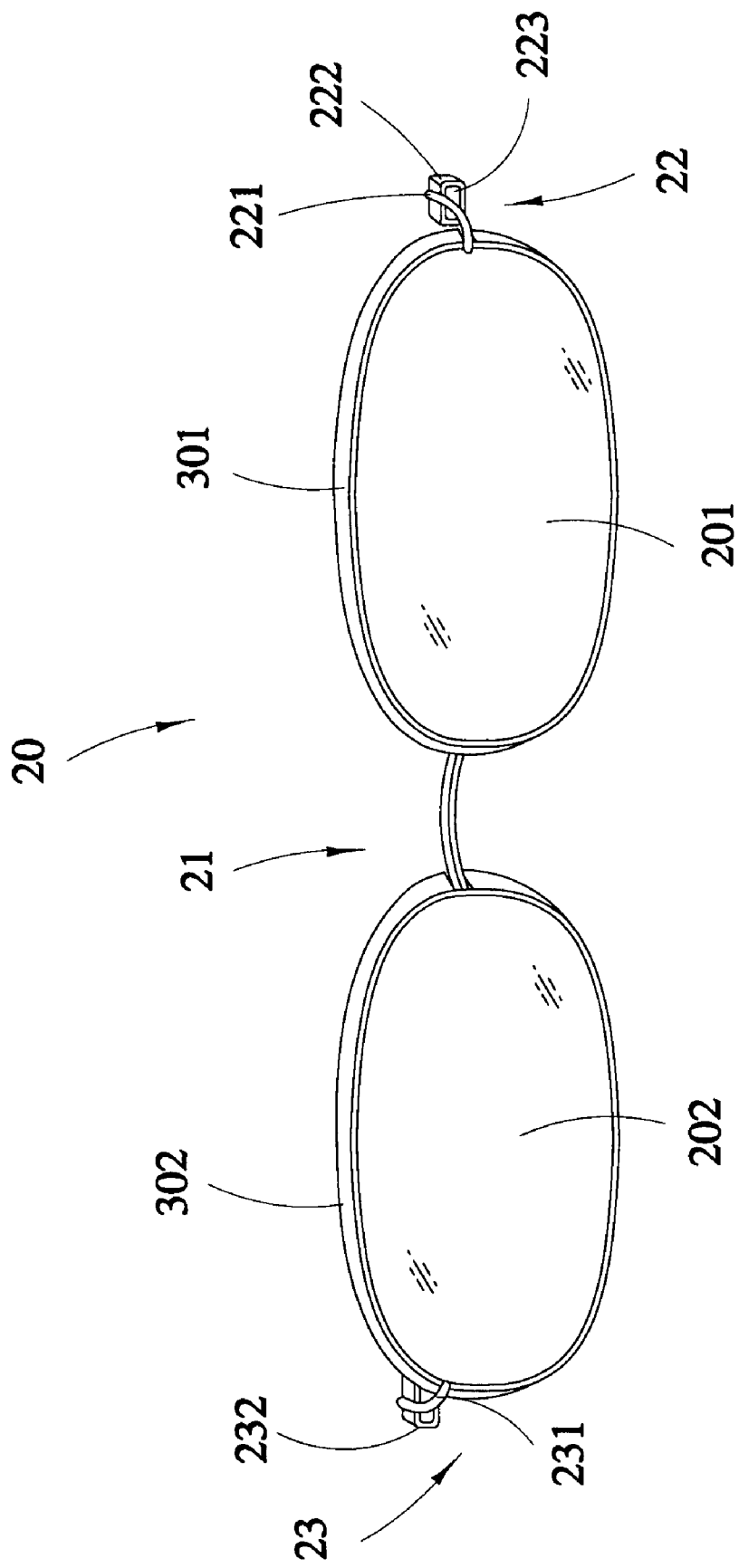
FIG. 3 is a perspective view of a fully-cover shelter frame according to a first preferred embodiment of the present invention.
Figure 4:
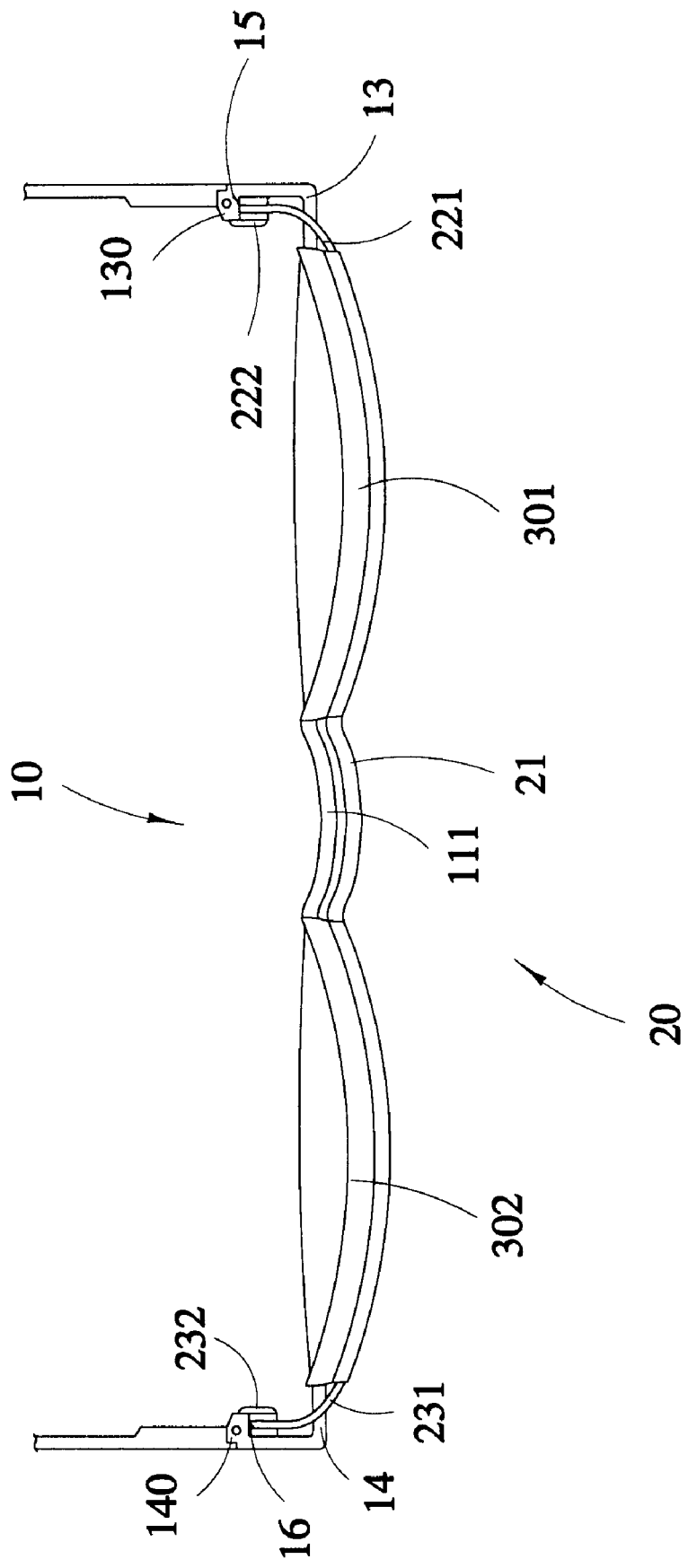
FIG. 4 is a top view of the fully-cover shelter frame mounted on the primary spectacle frame according to the above first preferred embodiment of the present invention.
Figure 5:
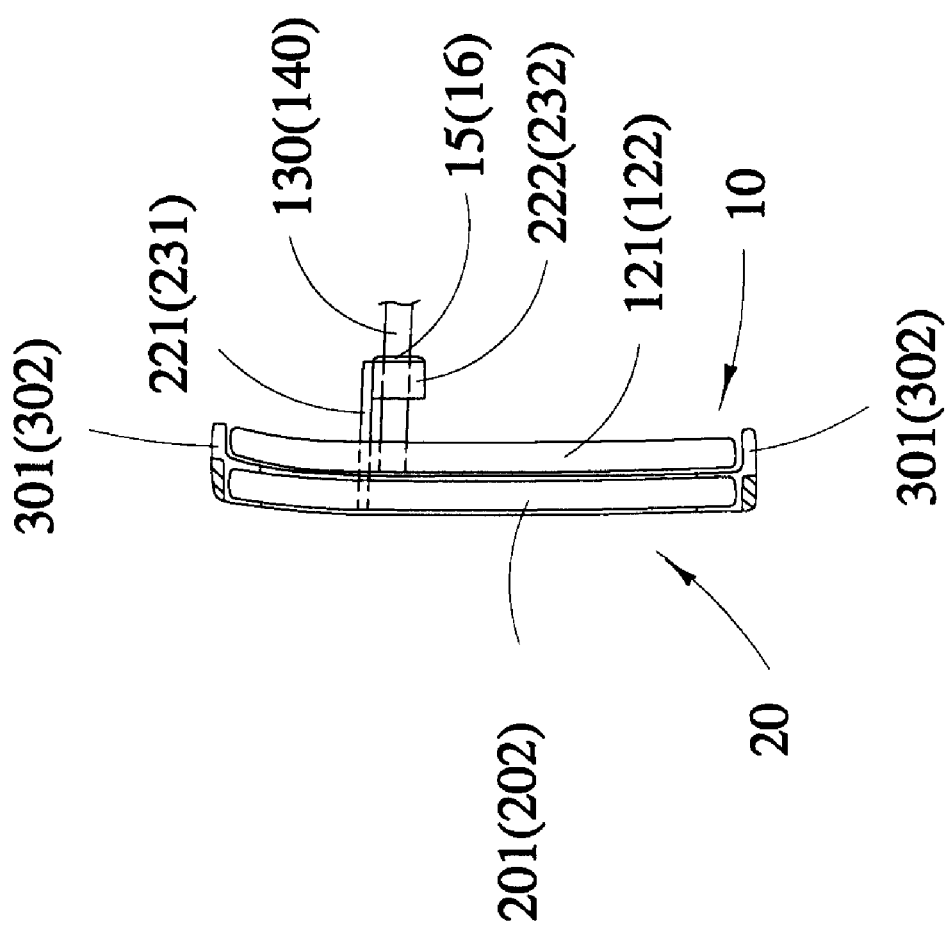
FIG. 5 is a partially sectional view of the fully-cover shelter frame mounted on the primary spectacle frame according to the above first preferred embodiment of the present invention.

Referring to FIGS. 3 to 5, the shelter frame 20 for supporting two auxiliary lenses 201, 202 comprises a bridge 21 extended between the two auxiliary lenses 201, 202, a pair of cover rims 301, 302 rearwardly extended from the two auxiliary lenses 201, 202 respectively, which are adapted for entirely encircling the two lenses 121, 122 of the primary spectacle frame 10 respectively, and two magnetic engaging means 22, 23 provided at two outer sides of the auxiliary lenses 201, 202 for magnetically engaging with the two engaging surface 15, 16 of the frame body 11 of the primary spectacle frame 10, so as to securely mount the shelter frame 20 on the primary spectacle frame 10. The two auxiliary lenses 201, 202 can be shaded lenses supported by the shelter frame 20 to form a detachable sunglasses.

The cover rims 301, 302 are preferably made of plastic that is light weight and easy to manufacture wherein metal is adapted to embed on the front surface of each cover rim 301, 302 so as to provide an aesthetic appearance of the fully-cover shelter frame 20, as shown in FIG. 5. The cover rims 301, 302 are fittingly encircling the two auxiliary lenses 201, 202 respectively, wherein the two lenses 121, 122 of the primary spectacle frame 10 are fittingly received in the two cover rims 301, 302 respectively. Each cover rim 301, 302 has a size at least larger than a size of the lens 121, 122 of the primary spectacle frame 10 such that the lens 121, 122 is adapted for receiving in the respective cover rim 301, 302. So, even though the size of the lenses 121, 122 is slightly smaller than the size of the cover rims 301, 302, the shelter frame 20 is still capable of mounting on the primary spectacle frame 10. Thus, each cover rim 301, 302 has a width at least wider than a gap between the auxiliary lens 201, 202 and the lens 121, 122 such that the lens 121, 122 is adapted for concealing from the cover rim 301, 302, as shown in FIG. 4. In other words, the circumferences of the two lenses 121, 122 of the primary spectacle are concealed from the cover rims 301, 302 respectively. So, the fully-cover shelter frame 20 of the present invention can change the shape of the primary spectacle frame 10 when the shelter frame 20 is mounted thereon since the lenses 121, 122 of the frame body 11 is concealed from the cover rims 301, 302.

Each of the magnetic engaging means 22, 23 comprises a supporting arm 221, 231 rearwardly extended from the each outer side of the auxiliary lens 201, 202 for riding on top of the respective side extension 13, 14 of the frame body 11 of the primary spectacle frame 10, a magnet housing 222, 232 downwardly connected from the supporting arm 221, 231, and a permanent magnet 223, 233 embedded on the magnet housing 222, 232 to form a magnetic rear surface arranged to magnetically attach to the respective engaging surface 15, 16 of the hinge members 130, 140 when the shelter frame 20 is mounted on the frame body 11 of the primary spectacle frame 10. Preferably, each magnet housing 222, 232 is made of non-magnetic material or soft-magnetic metal having magnetic attraction ability such as mild steel, low carbon steel and high grade steel such that the magnet housing 222, 232 can be magnetized by the permanent magnet 223, 233, so as to increase the magnetic attraction of the shelter frame 20 and the primary spectacle frame 10.

In order to mount the shelter frame 20 in front of the frame body 11 of the primary spectacle frame 10, the user simply use one hand to put the shelter frame 20 in front of the primary spectacle frame 10 wherein the two auxiliary lenses 201, 202 are aligned with the two lenses 121, 122 respectively. Due to the magnetic attraction, the rear surfaces of the two magnet housings 222, 232 are magnetically attracted to the engaging surfaces 15, 16 of the two side extensions 13, 14 of the primary spectacle frame 10 respectively. At the mean time, the cover rims 301, 302 can further guide the two magnetic housings 222, 232 to automatically align and attract with the two engaging surface 15, 16 respectively. The two cover rims 301, 302 of the shelter frame 20 will respectively encircling the lenses 121, 122 of the primary spectacle frame 10, as shown in FIG. 5, so as to further hold the primary spectacle frame 10 by preventing any upward, downward, leftward, and rightward movement of the shelter frame 20.

According to the present invention, the user can also detach the shelter frame 20 from the primary spectacle frame 10 easily by slightly pulling the shelter frame 20 away from the primary spectacle frame 10 until the two magnet housings 222, 232 of the two magnetic engaging means 22, 23 move frontwardly apart from the two engaging surfaces 15, 16 of the frame body 11 so that the magnetic attraction between the shelter frame 20 and the primary spectacle frame 10 is released. Then, the user may detach the shelter frame 20 by simple taking it out from the primary spectacle frame 10 with one hand.

Figure 6:
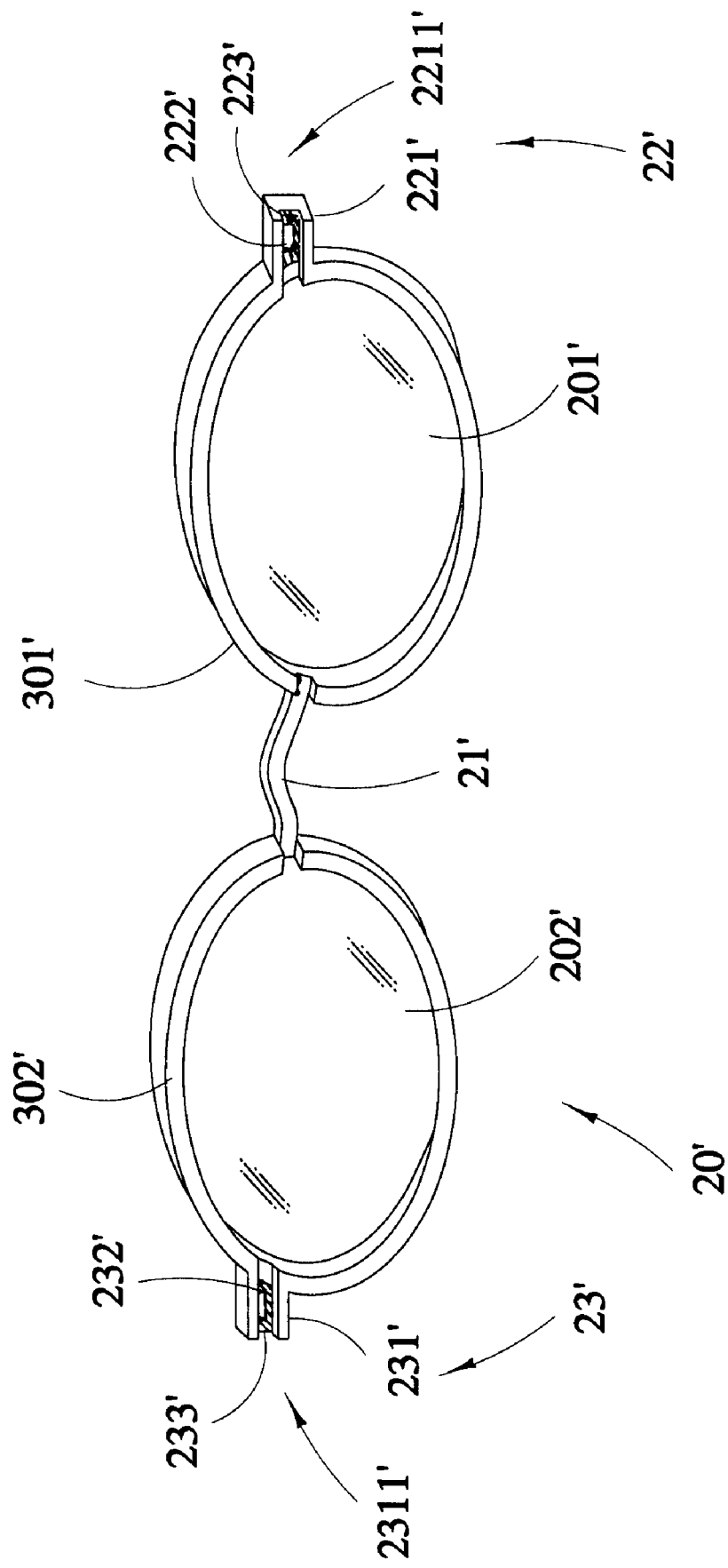
FIG. 6 is a rear perspective view of the fully-cover shelter frame according to a second preferred embodiment of the present invention.
Figure 7:
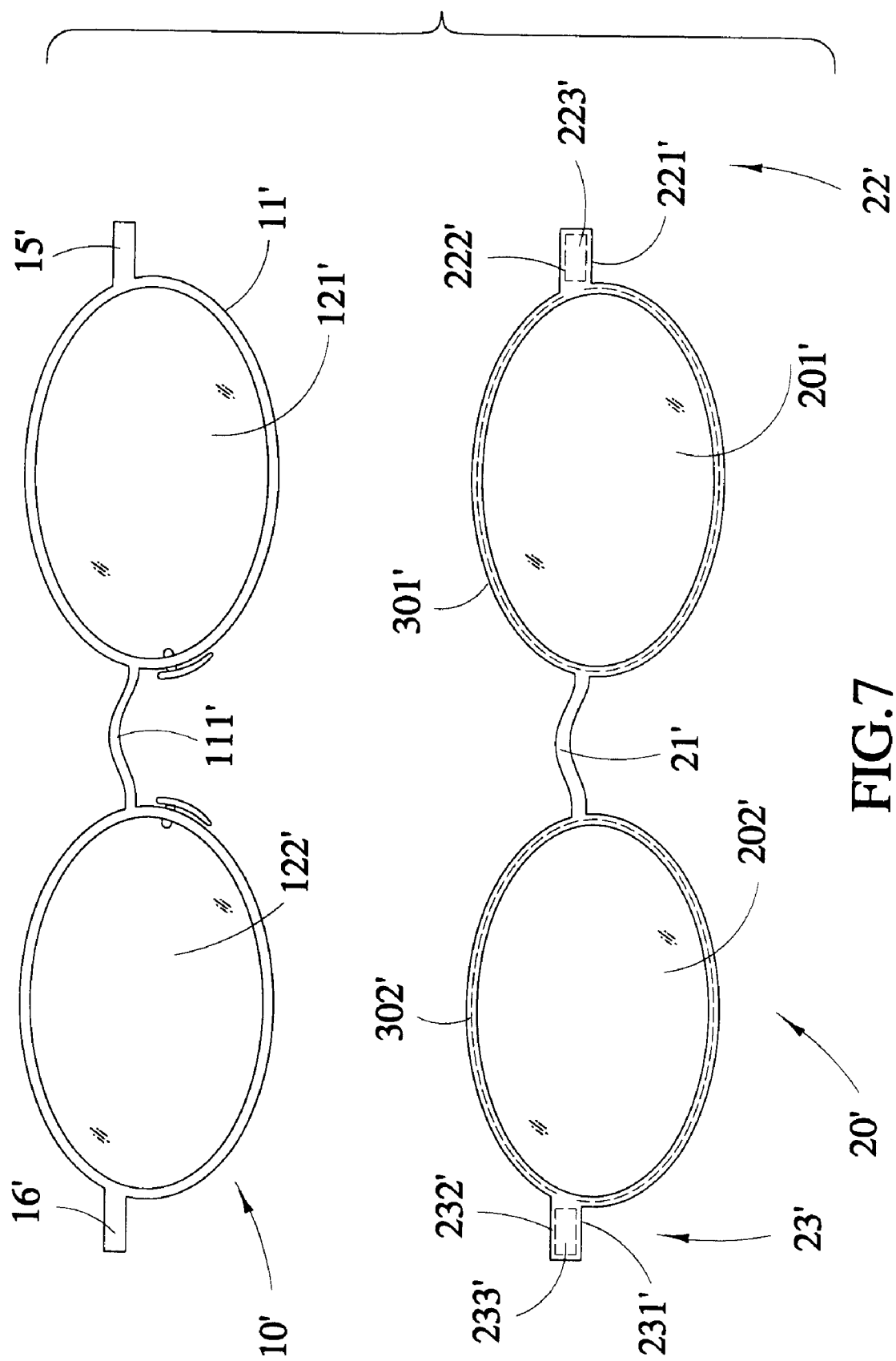
FIG. 7 is a front view of the fully-cover shelter frame and the primary spectacle frame according to the above second preferred embodiment of the present invention.
Figure 8:
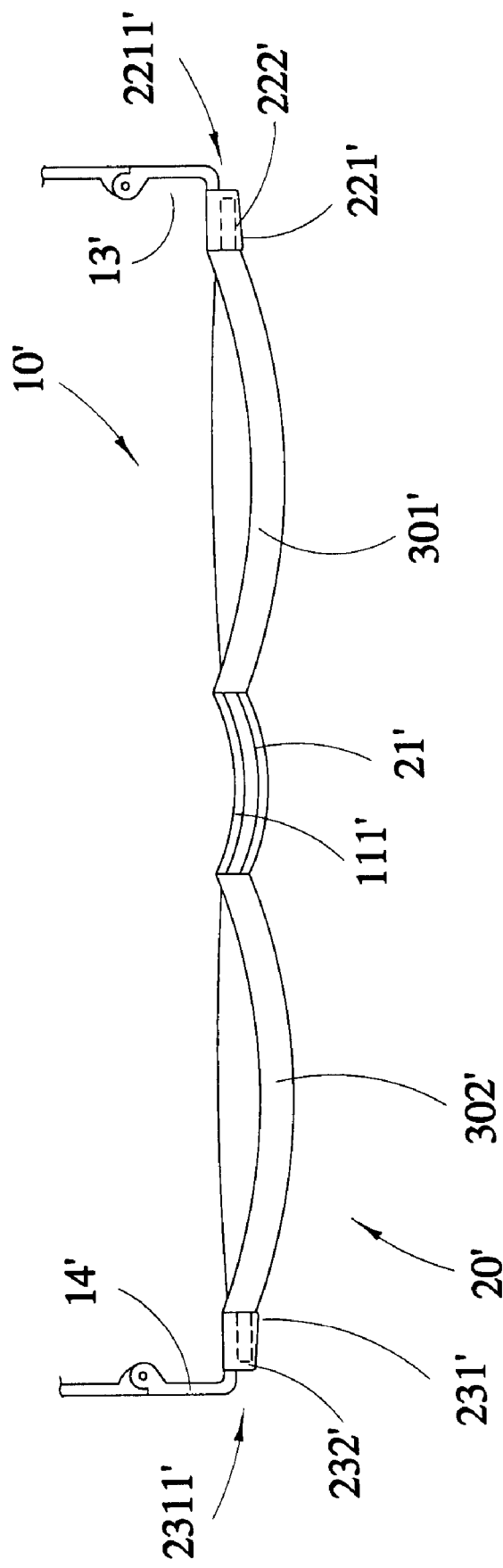
FIG. 8 is a top view of the fully-cover shelter frame mounted on the primary spectacle frame according to the above second preferred embodiment of the present invention.

Referring to FIGS. 6 to 8, a fully-cover shelter frame 10' and a primary spectacle frame 10' according to a second preferred embodiment of the present invention are illustrated, wherein the attraction and engagement concept of the second embodiment is the same as the above first embodiment. The modification in the second embodiment includes that the two engaging surfaces 15', 16' are provided on a front side of the two side extensions 13', 14, of the primary spectacle frame 10' respectively.

Each of the magnetic engaging means 22', 23' comprises the supporting arm 221', 231 ' outwardly extended from the respective auxiliary lens 201, 202, and a magnet housing 222', 232' having a permanent magnet 223', 233' received therein affixed on a rear side of the supporting arm 221', 231' for magnetically attracting the respective engaging surface 15', 16' of the side extension 13', 14', of the frame body 11', so as to securely mount the shelter frame 20' in front of the primary spectacle 10'.

Each of the supporting arm 221', 231' having a U-shaped cross sectional structure is integrally extended from the cover rim 301', 302' and defined an engaging slot 2211', 2311' in the supporting arm 221', 231' for the respective side extension 13', 14' receiving therein wherein the magnet housing 222', 232' is mounted on a bottom of the engaging slot 2211', 2311'. So, when the shelter frame 20' is mounted in front of the primary spectacle frame 10', the two side extensions 13', 14' are respectively mounted in the engaging slots 2211', 2311 ' wherein the engaging surfaces 15', 16' are magnetically attracted with the two permanent magnets 223', 233' respectively, as shown in FIG. 8.

Figure 9:
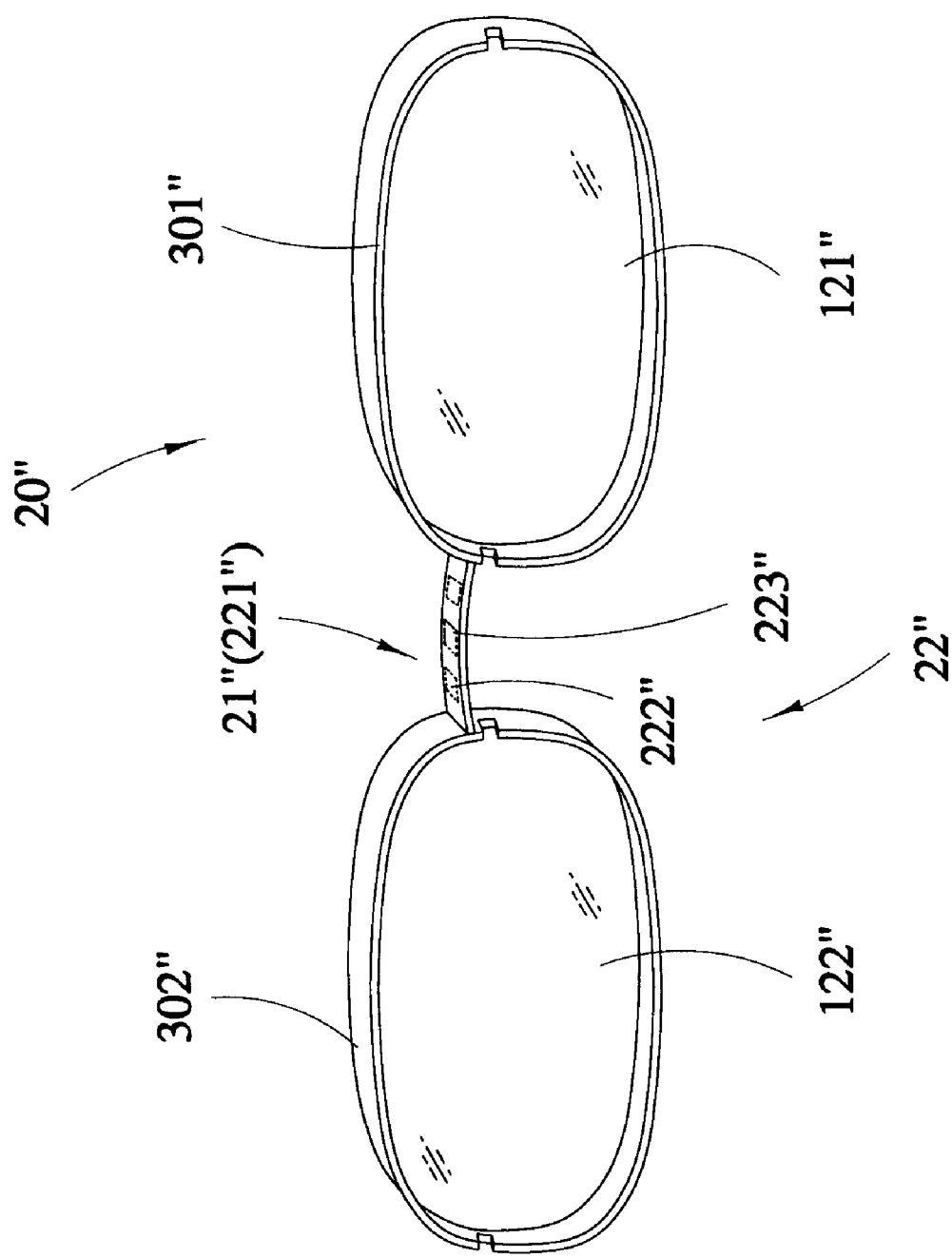
FIG. 9 is a rear perspective view of the fully-cover shelter frame according to a third preferred embodiment of the present invention.
Figure 10:
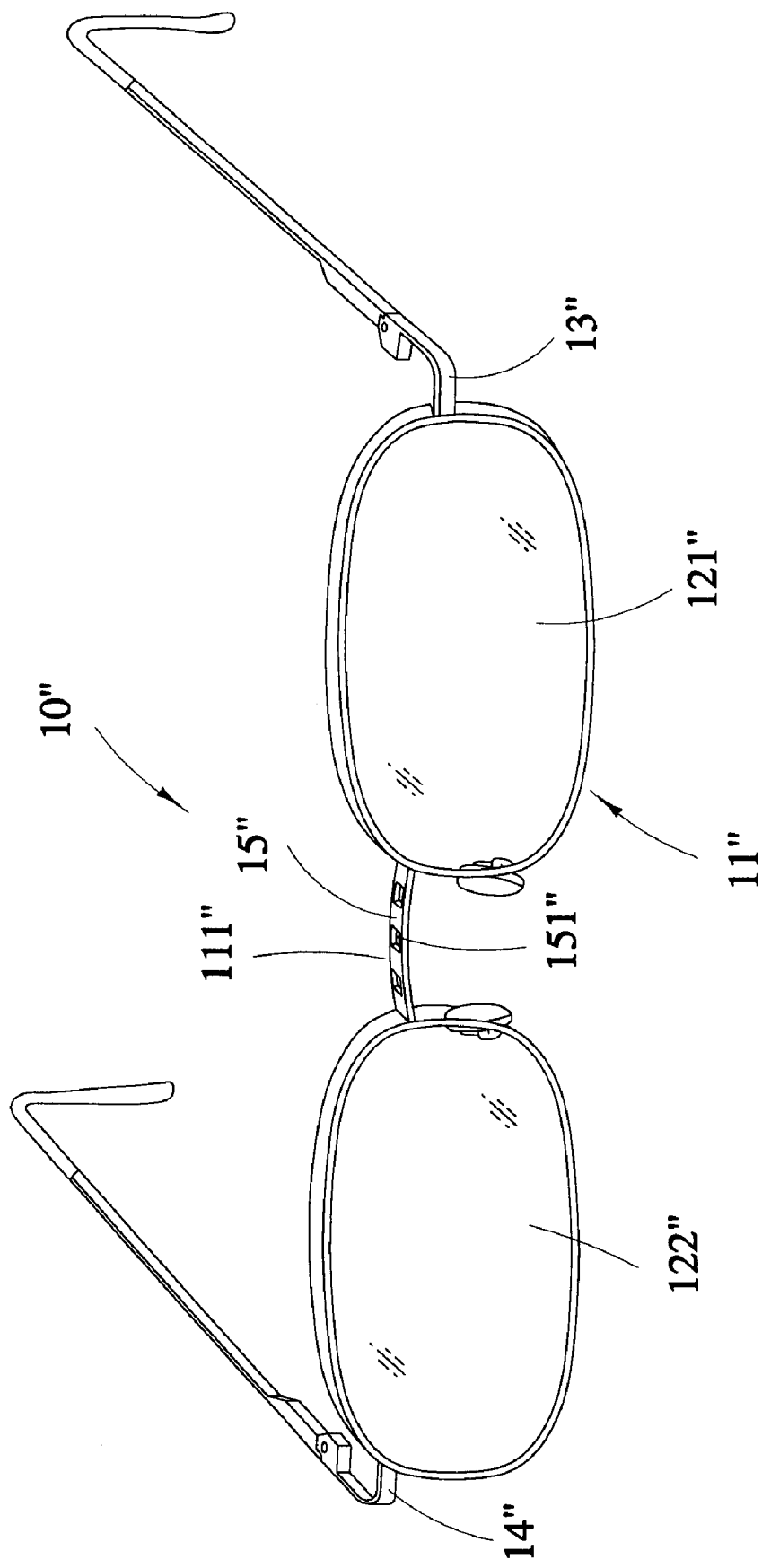
FIG. 10 is a perspective view of the primary spectacle frame according to the above third preferred embodiment of the present invention.
Figure 11:
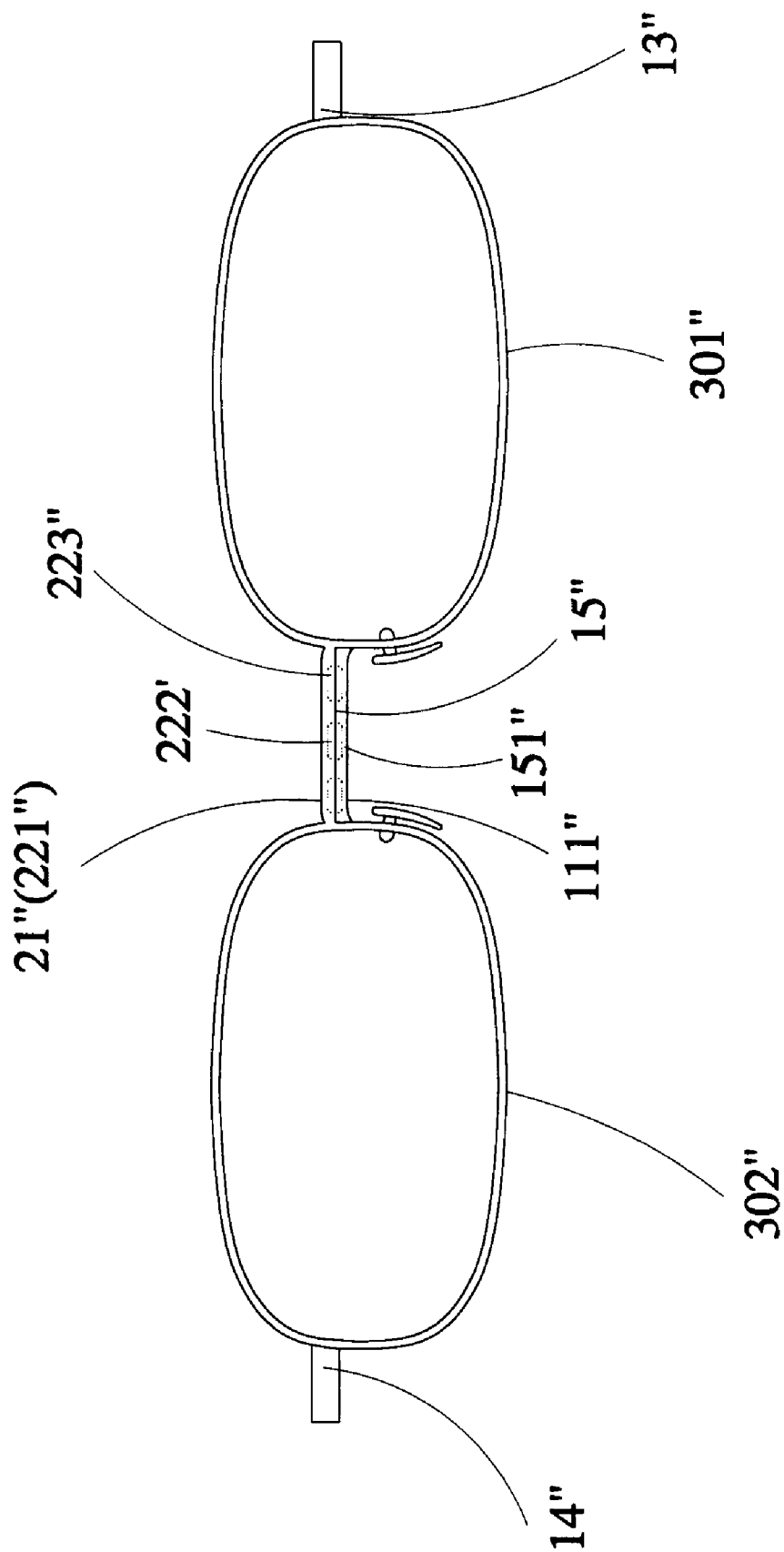
FIG. 11 is a front view of the fully-cover shelter frame mounted on the primary spectacle frame according to the above third preferred embodiment of the present invention.

Referring to FIGS. 9 to 11, a fully-cover shelter frame 20" and a primary spectacle frame 10" according to a third preferred embodiment of the present invention are illustrated, wherein the primary bridge 111" is made of soft-magnetic having magnetic attraction ability such as mild steel, low carbon steel and high grade steel. The engaging surface 15" is provided on a top surface of the primary bridge 111" wherein at least an engagement groove 151" is indented on top of the primary bridge 111".

The magnetic engaging means 22" comprises a supporting arm 221" which is the bridge 21" of the shelter frame 20" according to the third preferred embodiment, at least a magnet housing 222" mounted on a bottom surface of the supporting arm 221", and a permanent magnet 223" embedded on the magnet housing 222" wherein the permanent magnet 223" has a thickness larger than the depth of the magnet housing 222" so that a pole end of the permanent magnet 223" is downwardly protruded from the magnet housing 222". So, when the shelter frame 20" is mounted on the primary spectacle frame 10", the supporting arm 221" is magnetically attracted on top of the primary bridge 111" wherein the permanent magnet 223" is magnetically and fittingly engaged with the engaging groove 151", so as to engage the magnetic engaging means 22" with the engaging surface 15" of the primary spectacle frame 10". Thus, the magnetic attraction and engagement structure of the permanent magnet 223" and the engaging groove 151" also provide automatic alignment, engagement, and guiding functions so as to securely mount the shelter frame 20" in front of the primary spectacle 10", as shown in FIG. 11.

Figure 12:
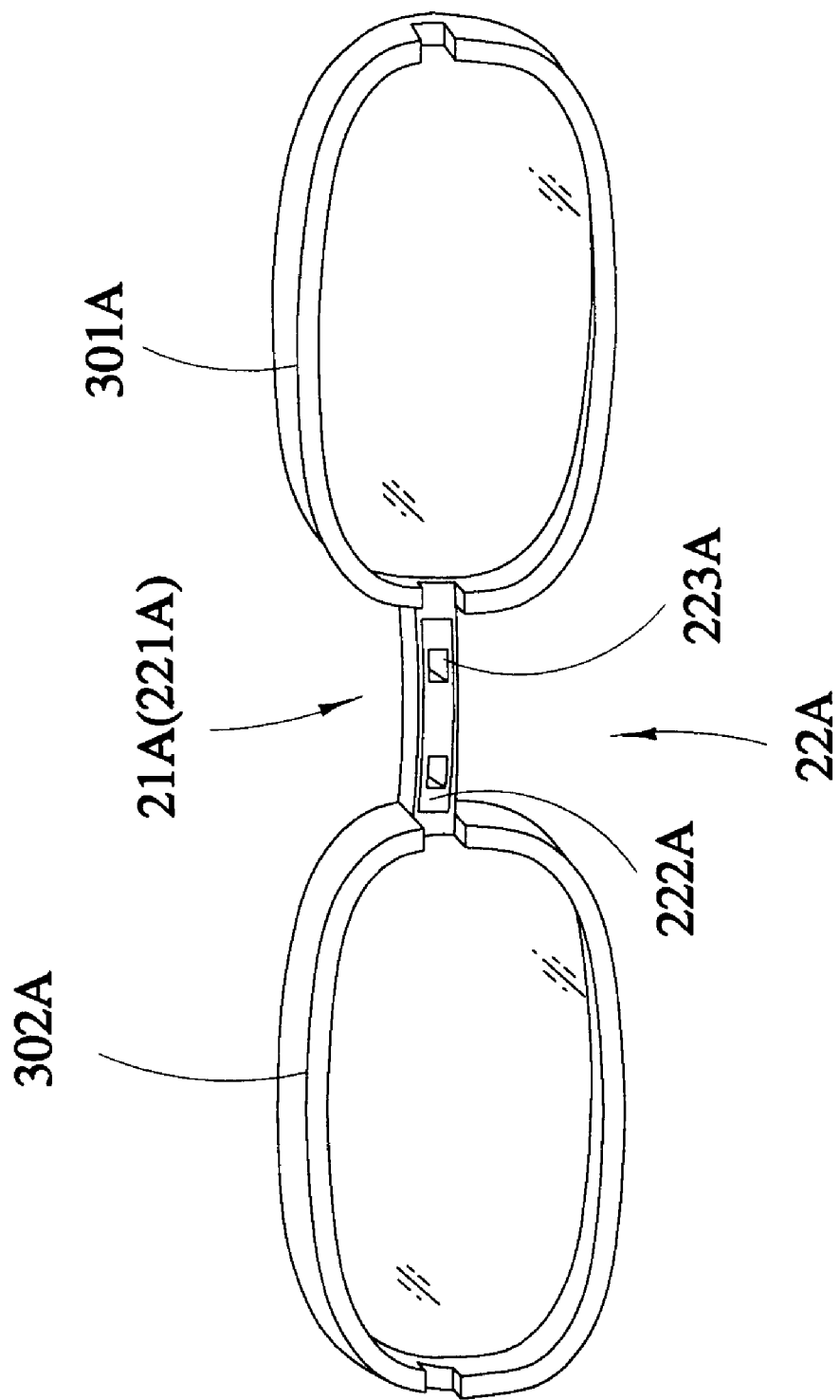
FIG. 12 is rear perspective view of the fully-cover shelter frame according to a fourth preferred embodiment of the present invention.
Figure 13:
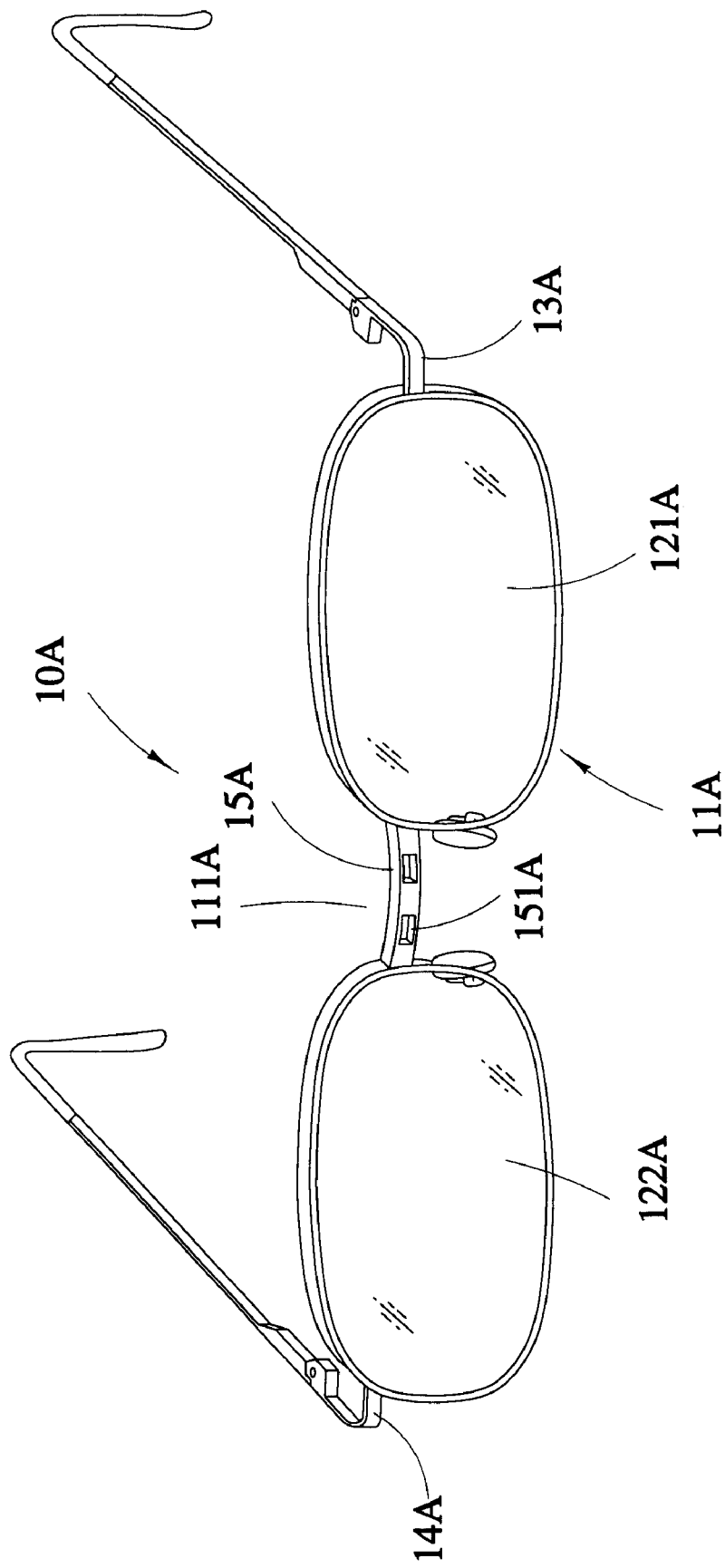
FIG. 13 is a perspective view of the primary spectacle frame according to the above fourth preferred embodiment of the present invention.
Figure 14:
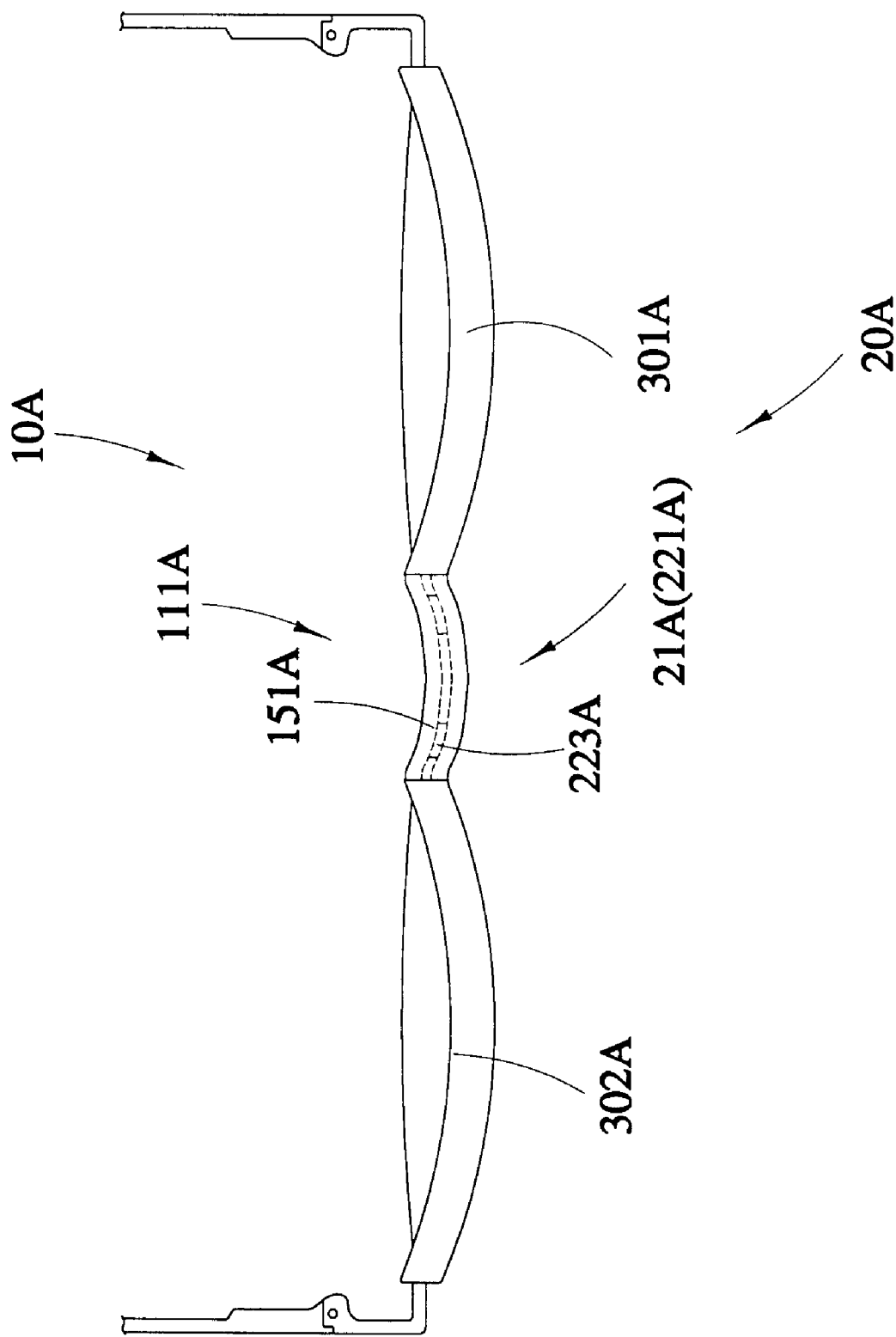
FIG. 14 is a to view of the fully-cover shelter frame mounted on the primary spectacle frame according to the above fourth preferred embodiment of the present invention.

Referring to FIGS. 12 to 14, a fully-cover shelter frame 20A according to a fourth embodiment of the present invention is illustrated, which basically is the modification of the third embodiment of the present invention.

According to the fourth embodiment, the primary bridge 111A is made of soft-magnetic having magnetic attraction ability such as mild steel, low carbon steel and high grade steel wherein the engaging surface 15A is provided on a front surface of the primary bridge 111A wherein at least an engagement grooves 151A is indented on the front surface of the primary bridge 111A.

The bridge 21A of the shelter frame 20A, which is the supporting arm 221A according to the fourth embodiment, comprises at least a magnet housing 222A embedded on a rear surface of the bridge 21A and a permanent magnet 223A embedded on the magnet housing 222A wherein the permanent magnet 223A has a thickness larger than the depth of the magnet housing 222A so that a pole end of the permanent magnet 223A is rearwardly protruded from the magnet housing 222A. So, when the shelter frame 20A is mounted in front of the primary spectacle frame 10A, the supporting arm 221A is magnetically attracted in front of the primary bridge 111A wherein the permanent magnet 223A is magnetically and fittingly engaged with the engaging groove 151A, so as to provide the same magnetic attachment of the third embodiment.

What is claimed is:

1. A spectacle set comprising a primary spectacle frame and a fully-cover shelter frame adapted for mounting on said primary spectacle frame, said primary spectacle frame, comprising a frame body mounting a pair of lenses in position, wherein said frame body comprises a primary bridge connected between said two lenses, two side extensions connected to two outer sides of said lenses respectively, and two hinge members extended rearwardly from said two side extensions respectively to pivotally couple with a pair of temples respectively, wherein a front end of each of said hinge members has an engaging surface formed thereon and said two engaging surfaces are made of soft magnetic metal having magnetic attraction ability, said shelter frame, which supports two auxiliary lenses thereon, comprising:
a bridge connected between said two auxiliary lenses,
a pair of cover rims rearwardly extended from said two auxiliary lenses respectively for encircling said two lenses of said primary spectacle frame respectively,
a pair of supporting arms which are connected to two outer sides of said two auxiliary lenses respectively and extended rearwardly over said side extensions of said frame body of said primary spectacle frame, and
a pair of magnet housings downwardly connected from said supporting arms respectively, wherein each of said magnet housing has a permanent magnet received therein to form a magnetic rear surface arranged to magnetically attach said engaging surfaces of said two hinge members so as to securely mount said shelter frame in front of said primary spectacle frame, wherein said two cover rims, each of which has a width at least wider than a gap formed between said auxiliary lenses and said lenses, encirclingly cover said gap between said auxiliary lenses and said lenses and periphery edges of said two lenses of said primary spectacle frame respectively, wherein said two cover rims further guide said two magnetic housings to automatically align and attract with said two engaging surfaces respectively.

2. The spectacle set, as recited in claim 1, wherein each of said cover rims has a size at least larger than a size of said lens of said primary spectacle frame such that said lens is adapted for receiving in said respective cover rim.

3. The spectacle set, as recited in claim 2, wherein said magnet housings are made of non-magnetic materials.

4. The spectacle set, as recited in claim 2, wherein said magnet housings are made of soft-magnetic metal having magnetic attraction ability.

5. The spectacle set, as recited in claim 1, wherein said magnet housings are made of non-magnetic materials.

6. The spectacle set, as recited in claim 1, wherein said magnet housings are made of soft-magnetic metal having magnetic attraction ability.

* * * * *